United States Patent Office 3,300,498
Patented Jan. 24, 1967

3,300,498
8-HYDROXYQUINOLINE METAL CHELATES
Herman Gershon, North Bergen, and Walter J. Nickerson, Princeton, N.J., assignors, by mesne assignments, to Herman Gershon, Yonkers, N.Y.
No Drawing. Filed May 8, 1962, Ser. No. 193,296
8 Claims. (Cl. 260—270)

This invention relates to new metal chelate compositions possessing pronounced antimicrobial properties.

The control of microorganisms is of vast importance. Among the industrial areas where infestations of microorganisms require control can be mentioned the pulp, paper and textile industries where organisms such as *Leuconostoc mesenteroides,* Penicillium spp., *Aspergillus niger, Trichoderma viride,* and *Myrothecium verrucaria* are encountered. Certain of these organisms digest cellulose readily, and, unless controlled, large economic losses result. For example, during prolonged storage of textiles in warehouses, or in tropical areas, or during transportation while in the holds of ships where relatively high humidity exists, fungal attack is a major problem. Particularly important are protective agents which afford prolonged control of the fungal infection and are easily removed when desired.

It is among the objects of the present invention to provide a class or group of novel chemical compositions useful in the control of microorganisms.

Another object of this invention is to provide such chemical compositions which are effective in controlling microorganisms infesting cellulosic materials and can readily be removed therefrom when desired.

Still another object of this invention is to provide novel chemical compositions having powerful antifungal properties against organisms including *Aspergillus niger, Trichoderma viride, Myrothecium verrucaria,* Penicillium sp. and *Trichophyton mentagrophytes,* and also antibacterial activity against *Escherichia coli, Streptococcus faecalis, Staphylococcus aureus* and *Leuconostoc mesenteroides.*

Other objects and advantages of the present invention will be apparent from the following detailed description thereof.

Compositions of this invention have the formula:

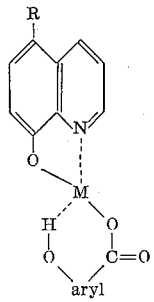

in which M represents bivalent Cu, Cd, Co, Pb, Mn, Hg, Zn, or Fe

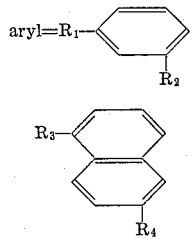

in which $R=H, Cl, I$
$R_1=H, Cl, I$
$R_2=H, Cl, I$
$R_3=H, Cl, Br$
$R_4=H, Br$

Preferred compositions of this invention are:

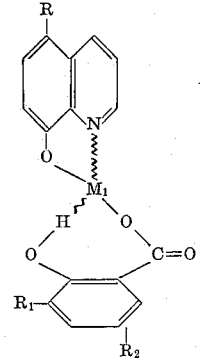

in which R, $R_1$ and $R_2$ have the values above given and $M_1$ is Cu;

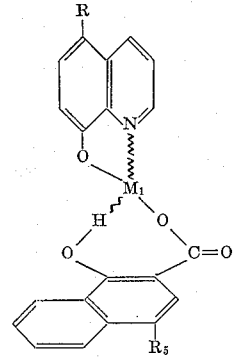

in which R and $M_1$ have the values above given and $R_5=H, Cl$;

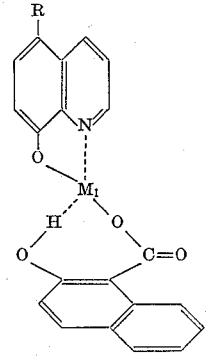

in which R and $M_1$ have the values above given;

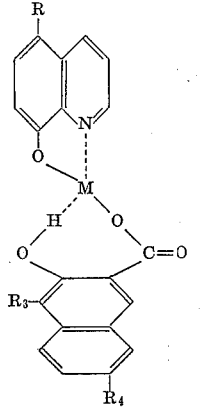

in which R, $R_3$, $R_4$ and M have the values above given.

These metal chelates can be prepared, for example, by reacting a saturated or near saturated solution of an 8-hydroxyquinolinium salt in a solvent, such as a lower aliphatic alcohol, e.g., methanol or ethanol, acetone, dioxane, chloroform, dimethylformamide or water, in which solvent the salt is sufficiently soluble to produce the saturated or near saturated solution with a solution of the metal salt in an aqueous solvent. Preferred metal salt solutions are the metal acetates, sulfates, chlorides and hydroxides. Stoichiometric or approximately molar amounts of the quinolinium salt and the metal salt are used. The reaction temperature can be from room temperature, about 20° C., up to the boiling point of the solvent used, under the pressure conditions at which the reaction is carried out. Temperatures near the boiling point are preferably employed because the reaction proceeds faster at such elevated temperatures. Desirably the reaction is carried out under atmospheric pressure conditions although it can be carried out under higher pressures. The reaction mixture is agitated and the reaction is continued, while agitating, until the metal chelate precipitates and a reaction mixture of uniform composition results, i.e., the metal chelate precipitate is distributed substantially uniformly throughout the reaction mixture under the agitation conditions employed. The mixing with agitation requires from a few minutes to prolonged periods as long as 24 hours or longer depending chiefly upon the reactants and the reaction temperature.

The 8-hydroxyquinolinium salts can be the salts disclosed and claimed in the co-pending application of Herman Gershon, Serial No. 152,025, filed November 13, 1961, now abandoned. This co-pending application discloses that hydroxy naphthoic acid salts of 8-hydroxyquinoline having the formula:

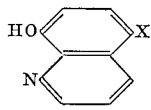

in which X is hydrogen, chlorine or iodine, react with hydroxy naphthoic acid having the formula:

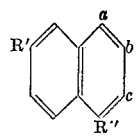

in which one of $a$, $b$ and $c$ is hydrogen and the other two in adjacent positions are respectively OH and COOH; R″ is hydrogen, chlorine or bromine and R′ is hydrogen or bromine.

Preferred 8-hydroxyquinolinium salts are:

(1) The 8-hydroxyquinolinium salts of 2-hydroxy-1-naphthoic acid having the formula:

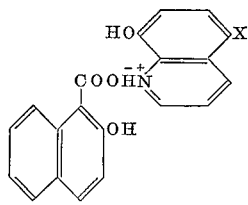

in which X is the elements above mentioned;

(2) The 8-hydroxyquinolinium salts of 1-hydroxy-2-naphthoic acid having the formula:

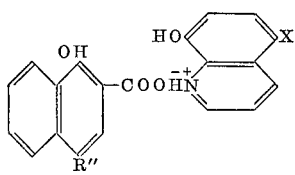

in which X and R″ are the elements above mentioned;

(3) The 8-hydroxyquinolinium salts of 3-hydroxy-2-naphthoic acid having the formula:

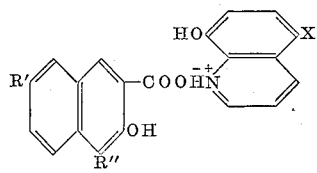

in which R″, R′ and X are the elements above mentioned.

The precipitated chelate compound can be removed from the reaction mixture of aqueous metal salt solution and saturated or near saturated solution of 8-hydroxyquinolinium salt hereinabove described by filtration; the thus separated chelate compound washed with water followed by a rinse with a water-miscible organic solvent, such as the lower alcohols, acetone, dimethylformamide or dioxane. Employing the metal acetate in producing the reaction mixture, the latter reaches a pH of from 5 to 6 at completion of the reaction, at which pH the metal chelate formed is stable. The metal salts of other acids such as the sulfates or chlorides or the metal hydroxides when employed require adjustment of the pH of the reaction mixture to the range of 5–6 to effect precipitation of the metal chelate. Such adjustment is readily effected by alkali, e.g., NaOH, when the pH must be increased, or acid such as an inorganic acid, desirably HCl, when the pH of the reaction mixture must be reduced.

The metal chelates of 8-hydroxyquinolinium salts of salicylic acid, 5-chlorosalicylic acid, 3,5-dichlorosalicylic acid, 5-iodosalicylic acid and 3,5-diiodosalicylic acid can be prepared in substantially the same manner as hereinabove described for the preparation of the 8-hydroxyquinolinium salts of hydroxy naphthoic acid and its enumerated halo derivatives. For example, a saturated or near saturated solution of 8-hydroxyquinolinium salicylic acid or the halo substituted salicyclic acid in a solvent such as those mentioned can be reacted with a metal salt, preferably the metal acetate, sulfate or chloride, or with the metal hydroxide employing approximately equi-molar amounts of the quinolinium and the metal compound. The reaction temperature can be from room temperature up to the boiling point of the solvent used, under the pressure conditions at which the reaction is carried out. Temperatures near the boiling point are preferably employed because the reaction proceeds faster at such elevated temperatures. Desirably the reaction is carried out under atmospheric pressure conditions, although it can be carried out under higher pressures. The reaction mixture is agitated and the reaction is continued while agitating until the metal chelate of the 8-hydroxyquinolinium salt of salicylic acid or its derivatives precipitates and a reaction mixture in which the metal chelate precipitate is distributed substantially uniformly therethroughout under the agitation conditions employed results.

Alternatively, the metal chelates, i.e., metal chelates of 8-hydroxyquinolinium hydroxy naphthoic acid and its derivatives as well as of 8-hydroxyquinolinium salts of salicylic acid and its derivatives, can be prepared by mixing the metal salt or metal hydroxide, the hydroxyquinoline derivative and the arylhydroxycarboxylic acid in water with or without a trace of wetting agent and adjusting the pH as hereinabove described to 5–6 during the course of the agitation. The metal chelate which precipitates is separated by filtration or centrifugal separation, washed with water followed by rinse with a water-miscible organic solvent.

The following examples are given to illustrate the invention, and it will be understood that the invention is not limited to these examples. All percentages herein are given on a weight basis, temperatures in degrees centigrade.

EXAMPLE I

*8-hydroxyquinolinium salicylate copper chelate*

To a solution prepared from 48.0 grams (0.24 mol) of cupric acetate monohydrate in 3120 ml. of 75% aqueous methyl alcohol was added a near boiling solution of 67.2 grams (0.24 mol) of 8-hydroxyquinolinium salicylate in 125 ml. of methanol. The mixture was agitated for 30 minutes, filtered, washed with water and followed by methyl alcohol. The yield of product was nearly quantitative, melting point 266–267° and was sufficiently pure for analysis. A sample recrystallized from chloroform melted at the same temperature.

*Analysis.*—Calculated for $C_{16}H_{11}NO_4Cu$: C, 55.72; H, 3.19; N, 4.06; Cu, 18.46. Found: C, 55.63; H, 3.30; N, 3.62; Cu, 18.79.

EXAMPLE II

*8-hydroxyquinolinium 3-hydroxy-2-naphthoate copper chelate*

*Method A.*—A mixture of 7.52 grams (0.04 mol) of 3-hydroxy-2-naphthoic acid, 5.8 grams (0.04 mol) of 8-hydroxyquinoline, 8.0 grams (0.04 mol) of copper acetate monohydrate, 300 ml. of water and a trace of wetting agent was made and agitated overnight at room temperature. The product was isolated by filtration, followed by water and methyl alcohol rinses and drying for 4 hours at 80°. The yield of chelate was nearly quantitative and melted at 256–258° and was sufficiently pure for analysis. Samples of analytical purity were also prepared by recrystallization from dimethyl formamide and from chloroform and melted at 257–259° and 259–260°, respectively.

*Analysis.*—Calculated for $C_{20}H_{13}NO_4Cu$: C, 60.82; H, 3.29; N, 3.55; Cu, 16.12. Found: C, 60.99; H, 3.46; N, 3.08; Cu, 16.10.

*Method B.*—To a solution of 25.0 grams (0.1 mol) of copper sulfate pentahydrate in 600 ml. of water was added 14.5 grams (0.1 mol) of 8-hydroxyquinoline, and 18.8 grams (0.1 mol) of 3-hydroxy-2-naphthoic acid. The mixture was agitated for about one hour and the pH was brought to 8–9 with 22.4 grams of 50% caustic soda and adjusted to 5–6 with several drops of concentrated sulfuric acid. After agitating at room temperature for 8 hours, the product was isolated in quantitative yield as previously described. The material was analytically pure without further purification and melted at 259–260°.

EXAMPLE III

*8-hydroxyquinolinium 4-chloro-1-hydroxy-2-naphthoate copper chelate*

This example differs from Example I chiefly in that instead of 8-hydroxyquinolinium salicylate, 8-hydroxyquinolinium 4-chloro-1-hydroxy-2-naphthoate was used. The conditions otherwise were the same.

A 92% yield of 8-hydroxyquinolinium 4-chloro-1-hydroxy-2-naphthoate copper chelate was obtained having a melting point of 250° of sufficient purity for analysis.

*Analysis.*—Calculated for $C_{20}H_{12}NO_4ClCu$: C, 55.96; H, 2.82; N, 3.26; Cu, 14.08. Found: C, 55.91; H, 2.79; N, 3.41; Cu, 14.20.

EXAMPLE IV

*8-hydroxyquinolinium 3,5-diiodosalicylate copper chelate*

To a solution of 10 grams (0.05 mol) of copper acetate monohydrate in 650 ml. of 75% aqueous methyl alcohol was added a solution of 26.8 grams (0.05 mol) of 8-hydroxyquinolinium 3,5-diiodosalicylate dissolved in a mixture of 250 ml. of methyl alcohol and 60 ml. of dimethylformamide. The mixture was stirred for 15 minutes and the product was isolated as described in the previous examples. The yield of chelate was 92%, melting point above 360°. The product was sufficiently pure for analysis.

*Analysis.*—Calculated for $C_{16}H_9NO_4I_2Cu$: C, 32.21; H, 1.52; N, 2.35; Cu, 10.65. Found: C, 32.59; H, 1.36; N, 2.32; Cu, 10.25.

EXAMPLE V

*8-hydroxyquinolinium 2-hydroxy-1-naphthoate copper chelate*

This example differed from Example I chiefly in the substitution of 8-hydroxyquinolinium 2-hydroxy-1-naphthoate for the quinolinium salt used in Example I. 8-hydroxyquinolinium 2-hydroxy-1-naphthoate copper chelate was obtained in a 64% yield having a melting point of 220–240°. This compound showed fair solubility in methyl alcohol and this explains the lower yield of the compound. The product, isolated following the procedure given in Example I, was sufficiently pure for analysis.

*Analysis.*—Calculated for $C_{20}H_{13}NO_4Cu$: C, 60.83; H, 3.32; N, 3.55; Cu, 16.09. Found: C, 60.32; H, 3.00; N, 3.28; Cu, 15.59.

EXAMPLE VI

*8-hydroxyquinolinium 3-hydroxy-2-naphthoate lead chelate*

A solution of 18.97 grams (0.05 mol) of lead acetate trihydrate in a mixture of 300 ml. of methyl alcohol and 100 ml. of water was prepared. To this mixture was added a few drops of acetic acid and a solution of 16.6 grams (0.05 mol) of 8-hydroxyquinolinium 3-hydroxy-2-naphthoate in 250 ml. of methyl alcohol. The mixture was stirred for one-half hour, and the product was obtained in nearly quantitative yield in the usual manner. It did not melt below 360°. The product was sufficiently pure for analysis.

*Analysis.*—Calculated for $C_{20}H_{13}NO_4Pb$: C, 44.61; H, 2.43; N, 2.60; Pb, 38.47. Found: C, 44.10; H, 2.32; N, 2.88; Pb, 38.93.

EXAMPLE VII

*8-hydroxyquinolinium 3-hydroxy-2-naphthoate mercury chelate*

This example differed from Example VI chiefly in the substitution of mercuric acetate for the lead acetate of Example VI. 8-hydroxyquinolinium 3-hydroxy-2-naphthoate mercury chelate was obtained in 90% yield having a melting point above 360°. The product was sufficiently pure for analysis.

*Analysis.*—Calculated for $C_{20}H_{13}NO_4Hg$: C, 45.16; H, 2.46; N, 2.63. Found: C, 44.71; H, 2.18; N, 2.66.

EXAMPLE VIII

*5-chloro-8-hydroxyquinolinium 3,5-diiodosalicylate copper chelate*

This example differed from Example I chiefly in the substitution of 5-chloro-8-hydroxyquinolinium 3,5-diiodosalicylate for the 8-hydroxyquinolinium salicylate. 5-chloro-8-hydroxyquinolinium 3,5-diiodosalicylate copper chelate was obtained in 60% yield having a melting point of 303°, of sufficient purity for analysis.

*Analysis.*—Calculated for $C_{16}H_8NO_4ClI_2Cu$: N, 2.22; Cu, 10.17. Found: N, 2.86; Cu, 10.79.

EXAMPLE IX

*5-chloro-8-hydroxyquinolinium 4,7-dibromo-3-hydroxy-2-naphthoate copper chelate*

This example differed from Example IV chiefly in the substitution of 5-chloro-8-hydroxyquinolinium 4,7-dibromo-3-hydroxy-2-naphthoate for 8-hydroxy quinolinium 3,5-diiodosalicylate. 5-chloro-8-hydroxyquinolinium 4,7-dibromo-3-hydroxy-2-naphthoate copper chelate was obtained in 98% yield having a melting point of 259° of sufficient purity for analysis.

*Analysis.*—Calculated for $C_{20}H_{10}NO_4Br_2ClCu$: N, 2.39. Found: N, 2.48.

Twenty-four other chelate compounds were prepared following the procedure of the above examples, which compounds are identified in the tables which follow, giving the antimicrobial screening data, in each case reacting the indicated 8-hydroxyquinolinium salt with the indicated metal salt, e.g., the acetate, employing the procedure hereinabove described and exemplified by the above examples.

The colors of the chelate compounds are given in the following list. Particular colors may be desirable for certain applications.

| Metal: | Color of chelate compound |
|---|---|
| Cu (II) | Green. |
| Cd (II) | Off white. |
| Co (II) | Tan. |
| Pb (II) | Off white. |
| Mn (II) | Tan. |
| Hg (II) | Orange. |
| Zn (II) | Yellow. |
| Fe (II) | Steel gray. |
| Fe (III) | Blue black. |
| Al (III) | Yellow. |

The novel metal chelates can be applied to the material to be protected in solution form, or by precipitation as the result of successive dips in solutions of the preformed salt (hydroxy carboxylic acid salts of 8-hydroxyquinolines) followed by a dip in a solution of the metal salt (e.g. acetate). Solutions of the metal chelate compounds having a concentration of about 0.1% to saturation in such solvents as chloroform, dioxane or dimethylformamide can be used.

By the alternative method of precipitation of the chelate compound on the material to be protected, such as cotton fabric, the fabric is first impregnated with the 8-hydroxyquinolinium salt dissolved in a solvent such as acetone. The impregnated fabric, from which the solvent is allowed to evaporate, is subsequently dipped into an aqueous solution of the desired metal salt (preferably the acetate) of concentration 0.1–10% at temperatures ranging from ambient to near boiling. The pH of the metal salt solution is kept between 5 and 6. The fabric is then rinsed in water and allowed to dry.

The metal chelate compounds herein disclosed afford prolonged antimicrobial protection and can be removed, should that be desired, by treatment of the fabric with dilute acid followed by successive rinses with dilute alkali and water. The first acid rinse decomposes the chelate and keeps the metal and quinoline in solution, and the alkali removes any remaining hydroxy carboxylic acid and residual acid from the first acid rinse.

The following test demonstrates the effectiveness of the metal chelate compounds in protecting cotton fabric against fungi. This antifungal test is that prescribed by The American Society for Testing Materials, Committee D-13, "ASTM Standard on Test Materials," 77, Philadelphia, 1943. Six inch by one inch strips of white cotton cloth weighing 570–580 mg. each were used. These strips were immersed in a 0.1% solution of 8-hydroxyquinolinium 3-hydroxy-2-naphthoate copper chelate in dimethylformamide, and the solvent was allowed to evaporate. Each strip contained from 0.5 mg. to 0.6 mg. of the protective agent, i.e., about 0.1%.

French square bottles (i.e., bottles square shaped in cross-section) of 16 ounce capacity were used as the incubation chambers. Into each bottle was placed a standard liquid inorganic nutrient medium for fungi having the following inorganic salt composition:

| Inorganic salts: | Grams/liter |
|---|---|
| $K_2HPO_4$ | 1.3940 |
| $MgSO_4$ | 0.7395 |
| $NH_4NO_3$ | 1.0006 |
| NaCl | 0.005 |
| Fe, Zn, and Mn as $SO_4$ | 0.001 |

Into each bottle while on its side was placed a glass filter sheet to act as a support for the cotton strip and to prevent its submersion in the solution. Sufficient inorganic salt solution was introduced into each bottle to soak the glass filter sheet therein, and the cotton strip was then placed on the filter sheet. The cotton strip became soaked with inorganic medium by capillarity, and the bottles were each capped with Pyrex glass wool and autoclaved for 20 minutes at 15 p.s.i.g.

To each sterile chamber thus produced was added 1 ml. of spore suspension containing $6 \times 10^6$ spores/ml. Penicillium sp. and *Myrothecium verrucaria* were used as the test organisms.

Controls for each organism consisted of one chamber containing no cotton cloth, one chamber containing unprotected cotton cloth, and one chamber which remained uninoculated. Three replicates of each bottle were used.

The bottles, prepared as above described, were incubated at 28–30° C. for 7–10 days. At the end of this period it was observed. The uninoculated bottles and the bottles containing no cotton showed no fungal growth, the bottles with unprotected cotton showed good fungal growth, and the bottles containing cotton cloth protected with 8-hydroxyquinolinium 3-hydroxy-2-naphthoate copper chelate showed no fungal growth.

This test demonstrated the effectiveness of 8-hydroxyquinolinium 3-hydroxy-2-naphthoate copper chelate in protecting cotton and particularly cotton cloth against infestation by the fungi employed as test organisms.

Table I presents the antibacterial activity of 33 metal chelate compounds as determined by the disc-plate method, and Table II contains the corresponding antifungal results. The organisms employed in our screening system included five bacteria (*Escherichia coli, Pseudomonas aeruginosa, Leuconostoc mesenteroides, Staphylococcus aureus,* and *Streptococcus faecalis*) and five fungi (*Aspergillus niger, Trichoderma viride, Myrothecium verrucaria,* Penicillium sp., and *Trichophyton mentagrophytes*). For the antibacterial testing, the following media were employed: *E. coli* and *Ps. aeruginosa,* nutrient agar (Difco); *S. aureus,* nutrient agar (Difco) enriched with 10% of beef serum; *S. faecalis* and *L. mesenteroides,* eugon agar (BBL). The fungal media employed were as follows: *A. niger, T. viride, M. verrucaria,* and Penicillium sp., Sabouraud's dextrose agar (Difco) and *T. mentagrophytes,* Sabouraud's dextrose agar enriched with 10% of beef serum.

The antibacterial tests were conducted in the following manner: to 100 ml. of agar medium at 45° was added 1 ml. of inoculum (18 hour culture of the respective organism grown on eugon broth (BBL) at 37°). While still liquid, the inoculated agar culture medium was distributed into 10 cm. Petri dishes at the rate of 15 ml. per dish. Six mm. filter paper discs, impregnated with three levels of compound each, $10^3$, $10^2$ and 10 micrograms/disc were placed on the hardened agar and incubated at 37° for 18 hours. The lowest level of compound causing inhibition was recorded.

For the antifungal studies, a spore suspension of the respective organism was prepared in 10 ml. of sterile 0.9% NaCl solution from a seven day culture of each fungus on a test tube slant of Sabouraud's dextrose agar at 28–30°. The 10 ml. of spore suspension was then incorporated into 500 ml. of medium at 45°, and 15 ml. portions of inoculated medium were poured into 10 cm. Petri dishes and allowed to harden. Filter paper discs, 12 mm. in diameter, which had previously been impregnated with three levels of compound, $10^4$, $10^3$, and $10^2$ micrograms/disc, were placed on the hardened agar and allowed to incubate at 28–30° for five days. The lowest level of compound causing inhibition was recorded.

In Table I which follows, *E. c.* is *Escherichia coli*; *P.a.* is *Pseudomonas aeruginosa*; *S. a.* is *Staphylococcus aureus*; *S. f.* is *Streptococcus faecalis* and *L. m.* is *Leuconostoc mesenteroides*:

TABLE 1.—ANTIBACTERIAL DATA
[Micrograms of chelate compound/disc causing inhibition]

| Compound | E. c | P. a. | S. a. | S. f. | L. m. |
|---|---|---|---|---|---|
| 8-hydroxyquinolinium salicylate copper chelate | $10^3$ | -------- | 10 | 10 | 10 |
| 8-hydroxyquinolinium 5-chlorosalicylate copper chelate | $10^3$ | $10^3$ | 10 | 10 | 10 |
| 8-hydroxyquinolinium 5-iodosalicylate copper chelate | $10^3$ | -------- | 10 | 10 | 10 |
| 8-hydroxyquinolinium 3,5-diiodosalicylate copper chelate | $10^3$ | -------- | 10 | 10 | 10 |
| 5-chloro-8-hydroxyquinolinium 5-chlorosalicylate copper chelate | $10^3$ | -------- | $10^2$ | $10^2$ | $10^2$ |
| 5-chloro-8-hydroxyquinolinium 3,5-dichlorosalicylate copper chelate | $10^3$ | -------- | $10^2$ | $10^2$ | $10^2$ |
| 5-chloro-8-hydroxyquinolinium 3,5-diiodosalicylate copper chelate | -------- | -------- | $10^2$ | -------- | -------- |
| 8-hydroxy-5-iodoquinolinium 3,5-diiodosalicylate copper chelate | -------- | -------- | $10^3$ | $10^3$ | -------- |
| 8-hydroxyquinolinium 3-hydroxy-2-naphthoate copper chelate | $10^3$ | -------- | 10 | 10 | 10 |
| 8-hydroxyquinolinium 4-chloro-3-hydroxy-2-naphthoate copper chelate | $10^3$ | -------- | 10 | 10 | 10 |
| 8-hydroxyquinolinium 4-bromo-3-hydroxy-2-naphthoate copper chelate | $10^3$ | -------- | 10 | 10 | 10 |
| 8-hydroxyquinolinium 7-bromo-3-hydroxy-2-naphthoate copper chelate | $10^3$ | -------- | 10 | 10 | 10 |
| 8-hydroxyquinolinium 4,7-dibromo-3-hydroxy-2-naphthoate copper chelate | $10^3$ | -------- | 10 | 10 | 10 |
| 8-hydroxyquinolinium 1-hydroxy-2-naphthoate copper chelate | -------- | -------- | 10 | 10 | $10^2$ |
| 8-hydroxyquinolinium 4-chloro-1-hydroxy-2-naphthoate copper chelate | $10^3$ | -------- | 10 | 10 | 10 |
| 8-hydroxyquinolinium 2-hydroxy-1-naphthoate copper chelate | $10^3$ | -------- | 10 | 10 | 10 |
| 5-chloro-8-hydroxyquinolinium 4-bromo-3-hydroxy-2-naphthoate copper chelate | -------- | -------- | $10^2$ | $10^3$ | $10^2$ |
| 5-chloro-8-hydroxyquinolinium 7-bromo-3-hydroxy-2-naphthoate copper chelate | $10^3$ | -------- | $10^2$ | $10^2$ | $10^2$ |
| 5-chloro-8-hydroxyquinolinium 4,7-dibromo-3-hydroxy-2-naphthoate copper chelate | $10^3$ | $10^3$ | $10^2$ | $10^3$ | $10^2$ |
| 5-chloro-8-hydroxyquinolinium 2-hydroxy-1-naphthoate copper chelate | $10^3$ | $10^3$ | $10^2$ | $10^2$ | $10^2$ |
| 8-hydroxy-5-iodoquinolinium 4-chloro-3-hydroxy-2-naphthoate copper chelate | -------- | -------- | $10^3$ | -------- | $10^3$ |
| 8-hydroxy-5-iodoquinolinium 4-bromo-3-hydroxy-2-naphthoate copper chelate | -------- | -------- | $10^3$ | $10^3$ | $10^3$ |
| 8-hydroxy-5-iodoquinolinium 7-bromo-3-hydroxy-2-naphthoate copper chelate | -------- | -------- | $10^3$ | $10^3$ | $10^2$ |
| 8-hydroxy-5-iodoquinolinium 4-chloro-1-hydroxy-2-naphthoate copper chelate | -------- | -------- | $10^2$ | -------- | $10^2$ |
| 8-hydroxyquinolinium 3-hydroxy-2-naphthoate cadmium chelate | $10^2$ | -------- | $10^2$ | $10^2$ | 10 |
| 8-hydroxyquinolinium 3-hydroxy-2-naphthoate cobaltous chelate | $10^2$ | $10^3$ | $10^2$ | -------- | $10^3$ |
| 8-hydroxyquinolinium 3-hydroxy-2-naphthoate lead chelate | $10^3$ | -------- | $10^2$ | $10^3$ | $10^2$ |
| 8-hydroxyquinolinium 3-hydroxy-2-naphthoate manganous chelate | -------- | -------- | 10 | 10 | -------- |
| 8-hydroxyquinolinium 3-hydroxy-2-naphthoate mercuric chelate | $10^3$ | $10^2$ | $10^2$ | $10^2$ | 10 |
| 8-hydroxyquinolinium 3-hydroxy-2-naphthoate ferrous chelate | -------- | -------- | 10 | -------- | -------- |
| 8-hydroxyquinolinium 3-hydroxy-2-naphthoate ferric chelate | -------- | -------- | 10 | 10 | -------- |
| 8-hydroxyquinolinium 3-hydroxy-2-naphthoate aluminum chelate | -------- | -------- | 10 | $10^2$ | -------- |
| 8-hydroxyquinolinium 3-hydroxy-2-naphthoate zinc chelate | $10^3$ | -------- | $10^3$ | $10^3$ | $10^3$ |

In Table 2, *A. n.* is *Aspergillus niger*; *T. m.* is *Trichophyton mentagrophytes*; P. sp. is *Penicillium* sp.; *M. v.* is *Myrothecium verrucaria*; and *T. v.* is *Trichoderma viride*.

TABLE 2.—ANTIFUNGAL DATA
[Micrograms of chelate compound/disc causing inhibition]

| Compound | A. n. | T. m. | P. sp. | M. v. | T. v. |
|---|---|---|---|---|---|
| 8-hydroxyquinolinium salicylate copper chelate | $10^3$ | $10^2$ | $10^2$ | $10^2$ | $10^2$ |
| 8-hydroxyquinolinium 5-chlorosalicylate copper chelate | $10^2$ | $10^2$ | $10^2$ | $10^2$ | $10^2$ |
| 8-hydroxyquinolinium 5-iodosalicylate copper chelate | $10^2$ | $10^2$ | $10^2$ | $10^2$ | $10^2$ |
| 8-hydroxyquinolinium 3,5-diiodosalicylate copper chelate | $10^3$ | $10^3$ | $10^2$ | $10^2$ | $10^2$ |
| 5-chloro-8-hydroxyquinolinium 5-chlorosalicylate copper chelate | $10^3$ | $10^3$ | $10^3$ | $10^3$ | $10^3$ |
| 5-chloro-8-hydroxyquinolinium 3,5-dichlorosalicylate copper chelate | $10^2$ | $10^3$ | $10^3$ | $10^2$ | $10^2$ |
| 5-chloro-8-hydroxyquinolinium 3,5-diiodosalicylate copper chelate | $10^3$ | $10^3$ | $10^3$ | $10^3$ | $10^3$ |
| 8-hydroxy-5-iodoquinolinium 3,5-diiodosalicylate copper chelate | $10^3$ | $10^3$ | -------- | $10^3$ | $10^3$ |
| 8-hydroxyquinolinium 3-hydroxy-2-naphthoate copper chelate | $10^2$ | $10^2$ | $10^2$ | $10^2$ | $10^2$ |
| 8-hydroxyquinolinium 4-chloro-3-hydroxy-2-naphthoate copper chelate | $10^2$ | $10^2$ | $10^2$ | $10^2$ | $10^2$ |
| 8-hydroxyquinolinium 4-bromo-3-hydroxy-2-naphthoate copper chelate | $10^2$ | $10^2$ | $10^2$ | $10^2$ | $10^2$ |
| 8-hydroxyquinolinium 7-bromo-3-hydroxy-2-naphthoate copper chelate | $10^2$ | $10^2$ | $10^2$ | $10^2$ | $10^2$ |
| 8-hydroxyquinolinium 4,7-dibromo-3-hydroxy-2-naphthoate copper chelate | $10^2$ | $10^2$ | $10^2$ | $10^2$ | $10^2$ |
| 8-hydroxyquinolinium 1-hydroxy-2-naphthoate copper chelate | $10^3$ | $10^2$ | $10^2$ | $10^2$ | $10^2$ |
| 8-hydroxyquinolinium 4-chloro-1-hydroxy-2-naphthoate copper chelate | $10^2$ | $10^3$ | $10^2$ | $10^3$ | $10^2$ |
| 8-hydroxyquinolinium 2-hydroxy-1-naphthoate copper chelate | $10^2$ | $10^2$ | $10^2$ | $10^2$ | $10^2$ |
| 5-chloro-8-hydroxyquinolinium 4-bromo-3-hydroxy-2-naphthoate copper chelate | $10^2$ | $10^3$ | $10^3$ | $10^3$ | $10^3$ |
| 5-chloro-8-hydroxyquinolinium 7-bromo-3-hydroxy-2-naphthoate copper chelate | $10^2$ | $10^3$ | $10^3$ | $10^3$ | $10^3$ |
| 5-chloro-8-hydroxyquinolinium 4,7-dibromo-3-hydroxy-2-naphthoate copper chelate | $10^2$ | $10^3$ | $10^3$ | $10^3$ | $10^3$ |
| 5-chloro-8-hydroxyquinolinium 2-hydroxy-1-naphthoate copper chelate | $10^3$ | $10^3$ | $10^3$ | $10^3$ | $10^2$ |
| 8-hydroxy-5-iodoquinolinium 4-chloro-3-hydroxy-2-naphthoate copper chelate | $10^3$ | -------- | -------- | -------- | -------- |
| 8-hydroxy-5-iodoquinolinium 4-bromo-3-hydroxy 2-naphthoate copper chelate | $10^3$ | $10^3$ | -------- | -------- | $10^4$ |
| 8-hydroxy-5-iodoquinolinium 7-bromo-3-hydroxy-2-naphthoate copper chelate | $10^3$ | $10^3$ | -------- | $10^3$ | -------- |
| 8-hydroxy-5-iodoquinolinium 4-chloro-1-hydroxy-2-naphthoate copper chelate | $10^3$ | $10^3$ | -------- | -------- | $10^4$ |
| 8-hydroxyquinolinium 3-hydroxy-2-naphthoate cadmium chelate | $10^3$ | $10^2$ | $10^3$ | $10^2$ | $10^3$ |
| 8-hydroxyquinolinium 3-hydroxy-2-naphthoate cobaltous chelate | $10^3$ | -------- | -------- | -------- | $10^3$ |
| 8-hydroxyquinolinium 3-hydroxy-2-naphthoate lead chelate | $10^3$ | $10^2$ | $10^3$ | $10^2$ | $10^2$ |
| 8-hydroxyquinolinium 3-hydroxy-2-naphthoate manganous chelate | $10^3$ | $10^2$ | $10^3$ | $10^2$ | $10^2$ |
| 8-hydroxyquinolinium 3-hydroxy-2-naphthoate mercuric chelate | $10^3$ | $10^2$ | $10^3$ | $10^2$ | $10^3$ |
| 8-hydroxyquinolinium 3-hydroxy-2-naphthoate ferrous chelate | | | | | |

Continued

TABLE 2.—ANTIFUNGAL DATA.—Continued

| Compound | A. n. | T. m. | P. sp. | M. v. | T. v. |
|---|---|---|---|---|---|
| 8-hydroxyquinolinium 3-hydroxy-2-naphthoate ferric chelate | | | | | |
| 8-hydroxyquinolinium 3-hydroxy-2-naphthaoate aluminum chelate | $10^3$ | $10^2$ | $10^4$ | $10^2$ | $10^2$ |
| 8-hydroxyquinolinium 3-hydroxy-2-naphthoate zinc chelate | $10^2$ | | | $10^4$ | $10^4$ |

It will be noted that the present invention provides a class of novel chemical compositions useful in the control of microorganisms, particularly, but not confined to those infesting cellulosic materials, such, for example, as cotton fabrics, paper and pulp. The metal chelates of this invention when applied give prolonged control over microorganisms and can readily be removed when desired by successive treatments with dilute acid, alkali and water.

It will be understood that this invention is not to be limited to the disclosure herein except as indicated by the appended claims.

What is claimed is:

1. A metal chelate having the formula:

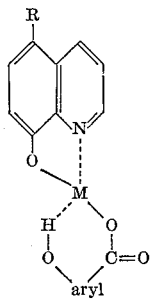

in which the

and the

are positioned on adjacent carbon atoms of the aryl nucleus M is selected from the group consisting of bivalent copper, cadmium, cobalt, lead, manganese, mercury, zinc, and iron; aryl is selected from the group consisting of

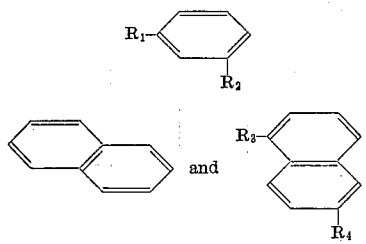

in which R is selected from the group consisting of hydrogen, chlorine and iodine; $R_1$ is selected from the group consisting of hydrogen, chlorine and iodine; $R_2$ is selected from the group consisting of hydrogen, chlorine and iodine; $R_3$ is selected from the group consisting of hydrogen, chlorine and bromine; and $R_4$ is selected from the group consisting of hydrogen and bromine and the bonds to the aryl group are attached to adjacent carbon atoms in ortho position in respect to each other.

2. 8-hydroxyquinolinium salicylate copper chelate.
3. 8-hydroxyquinolinium 3-hydroxy-2-naphthoate copper chelate.
4. 8-hydroxyquinolinium 2-hydroxy-1-naphthoate copper chelate.
5. 8-hydroxyquinolinium 3-hydroxy-2-naphthoate lead chelate.
6. 8-hydroxyquinolinium 3-hydroxy-2-naphthoate mercury chelate.
7. A metal chelate having the following formula:

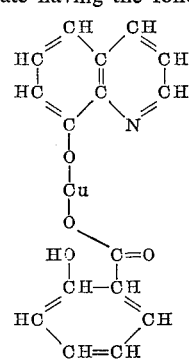

8. A metal chelate having the following formula:

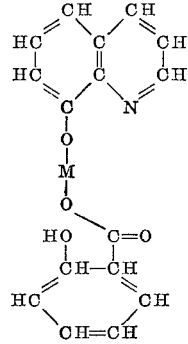

in which M is a metal selected from the group consisting of bivalent copper, cadmium, cobalt, lead, manganese, mercury, zinc and iron.

References Cited by the Examiner

UNITED STATES PATENTS

| | | | |
|---|---|---|---|
| 1,754,251 | 4/1930 | Yates | 21—58 |
| 2,474,818 | 7/1949 | Burckhalter et al. | 260—286 |
| 2,608,556 | 8/1952 | Kalberg | 260—270 |
| 2,618,645 | 11/1952 | Bowles | 260—270 |
| 2,681,910 | 6/1954 | Burckhalter | 260—286 |
| 2,799,615 | 6/1957 | Heymons et al. | |
| 2,871,091 | 1/1959 | Passedovet | 21—58 |
| 2,891,011 | 6/1959 | Insalaco | 252—62.1 |

FOREIGN PATENTS 893,513   7/1944   France.

OTHER REFERENCES

Badger, The Chemistry of Heterocyclic Compounds, pp. 318–19, (1961).

ALEX MAZEL, *Primary Examiner.*

D. McCUTCHEN, NICHOLAS S. RIZZO, HENRY R. JILES, *Examiners.*

D. M. KERR, D. G. DAUS, *Assistant Examiners.*